United States Patent [19]

Mainvielle

[11] 4,165,811

[45] Aug. 28, 1979

[54] MATERIAL GRIPPING DEVICE

[75] Inventor: Christian Mainvielle, Bassens, France

[73] Assignee: Service d'Exploitation Industrielle des Tabacs et des Allumettes, Paris, France

[21] Appl. No.: 883,280

[22] Filed: Mar. 3, 1978

Related U.S. Application Data

[63] Continuation-in-part of Ser. No. 742,425, Nov. 17, 1976, abandoned.

[30] Foreign Application Priority Data

Nov. 17, 1975 [FR] France ............................... 75 34948

[51] Int. Cl.2 ............................................ B65G 65/04

[52] U.S. Cl. .................................. 414/412; 271/18.3; 294/61

[58] Field of Search ................ 271/18.3; 294/61, 50.5, 294/50.6, 50.7, 50.8, 86 R, 81 R, 120, 121, 126, 81 SF; 214/304, 305; 212/11

[56] References Cited

U.S. PATENT DOCUMENTS

| | | | |
|---|---|---|---|
| 166,171 | 7/1875 | White | 294/61 |
| 2,205,550 | 6/1940 | Wehr | 294/121 |
| 2,539,849 | 1/1951 | Lum | 294/61 |
| 2,809,067 | 10/1957 | Macchi | 294/61 |
| 3,493,258 | 2/1970 | Wyrough | 294/81 SF |
| 3,853,235 | 12/1974 | Lambert et al. | 214/305 |

*Primary Examiner*—Lawrence J. Oresky
*Attorney, Agent, or Firm*—Jacobs & Jacobs

[57] ABSTRACT

A device for gripping and transferring a fabric material such as a canvas sack or the wrapper of a bale is disclosed comprising a carriage movable on a rail and on which is mounted a gripping assembly. The gripping assembly includes a disc having engagement tines disposed thereon which is driven by a low torque motor. The operations of lowering the discs for engagement of the fabric, engagement and transfer of the fabric are integrated for sequential action.

5 Claims, 4 Drawing Figures

MATERIAL GRIPPING DEVICE

CROSS-REFERENCE

This is a continuation-in-part of Ser. No. 742,425, filed Nov. 17, 1976, now abandoned.

DETAILED DESCRIPTION

The present invention relates to a device for engagement of fabric material such as a woven canvas wrapper or bag and for its transfer from the point where it is gripped or engaged to a point where it is released. The device is part of and complements an entire unit for emptying sack-shaped packings of a fabric material capable of being gripped. The invention relates also to the process of utilizing such a device in the emptying of sacks or bales.

By way of example, tobacco leaves are generally packed for shipment and storage in jute canvas bales with the packed tobacco forming a relatively compact mass. According to needs, the bales are opened and the tobacco leaves removed for subsequent processing. Towards this end, the bales are forwarded on a conveyor belt where they are hand cut around their perimeter. The upper portion of the canvas is then lifted and the bottom portion, together with the contents, is tipped in the direction of a receiving opening in order to empty the tobacco leaves and remove the cut-out sack.

Numerous other materials are shipped in a similar form and opened in the same fashion.

The object of the present invention is to provide an alternative for some of the hand operations, thereby improving the handling and processing conditions by using an appartus of very simple design and of low manufacturing cost.

The device according to the invention is disposed on a carriage or support movable on a rail. On the carriage or support is mounted the gripping assemblies which includes a rotative member or disc which can have a piercing point at the leading end whose axis is the same as the rotation axis but will necessarily have at least one hook or tine fixed thereto. The hook or time is L-shaped with a first support portion attached to the disc and a second pointed portion substantially perpendicular to the plane in which lie both the rotation axis and the first portion of the hook or tine. Such a disposition in relation to the rotation axis of the disc permits exertion of a force by the active part of said hook during rotation of the disc, causing the fabric material to be engaged by the hook. The piercing point serves as a positioning device.

Preferably, there are provided two gripping assemblies mounted on an articulated trapezoid. Bales are cumbersome and the use of two gripping members ensures on one hand a good grip on the canvas and on the other the correct opening of the cut-out bale. Also the use of two gripping assemblies permits a unique method of controlling engagement of the fabric, as discussed below. In addition, the mounting of the gripping assembly on an articulated trapezoid so that each can be lowered until it encounters the fabric of the bale takes cognizance of the fact that bales are often slightly out of shape as a result of handling. Both gripping members will thereby fulfill their function by being adaptable to differences in the level or upper surface of the bale.

To ensure a better grip still, the gripping members or discs are rotated in reverse or opposing directions relative to one another, the respective disposition of the hooks or tines also being reversed. The canvas is thus stretched between the discs, thereby causing an efficient grip. There is preferably provided two hooks or tines which are mounted on the disc offset equidistant from the rotation axis.

The gripping assembly is arranged so that the discs are lowered until each is in good contact with the bale fabric, even to the point of applying a slight pressure on the fabric. When the disc is rotated, the tines or hooks disposed thereon will therefore pierce and engage the fabric.

The rotation movement of the discs is provided by a vertically shafted, reversible, low torque motor. This can be electric but is preferably pneumatic. The use of a pneumatic motor is advantageous in that it can withstand frequent stallings without damage. Furthermore due to its low torque, it stops as soon as the force exerted by the tension in the fabric stretched between two discs upon rotation reaches a predetermined level. Damage to the gripping members and to the gripped fabric, which might be torn by a motor of excessive torque, is thereby prevented. Thus, the stop position of the motor, the point at which its rotation terminates, corresponds to the blockage position of the gripping discs, i.e., a predetermined tension valve for the stretched fabric, and initiates the subsequent movement of the gripping assembly. A good hold on or engagement of fabric is thus ensured.

Advantageously, the distance between the gripping assembly axis is adjustable for adaptation to the various sizes of bales, sacks and the like.

The gripping assemblies are mounted on the support or carriage for independent reciprocal movement along the vertical axis. Such movement can be provided through any conventional means but is preferably pneumatic, such as a piston and cylinder. This permits integration with the pneumatic motor of the gripping assemblies. As noted above, the gripping assemblies can be mounted on an articulated trapezoid so that each paid will descend in unison at the same rate until one or both contact the fabric of the bale. In the case of an uneven upper surface, the other gripping assembly will continue its descent until it too contacts the surface. At that point there will be an equal back pressure in each of the cylinders which, upon being sensed, initiates rotation of the pneumatic motor, as discussed above. Thereafter upon engagement of the fabric by the rotation of the discs, the fabric is stretched until the tension counterbalances the torque of the motor as measured at the tines or hooks. When this valve is reached, the gripping assemblies are raised by reducing the pressure in the cylinders, thereby lifting the engaged fabric.

The device can thus be used to empty the contents of a sack or bale of a substantially trapezoidal shape. The sack or bale can thus be first cut on three sides along a continuous line contained in a plane which includes a diagonal of two opposite sides. The sack or bale is gripped on two points of one side located at a distance from one another near the edge forming the apex of the triangular prism whose base is the cross-sectional plane. The gripped side is lifted as described above and the sack or bale is emptied of its contents. The engaged fabric is then forwarded to a point where it is released and the gripping assembly is returned to its initial position.

The description which follows, taken in conjunction with the accompanying drawings, illustrates an embodiment of the device according to the invention.

Figure 1:
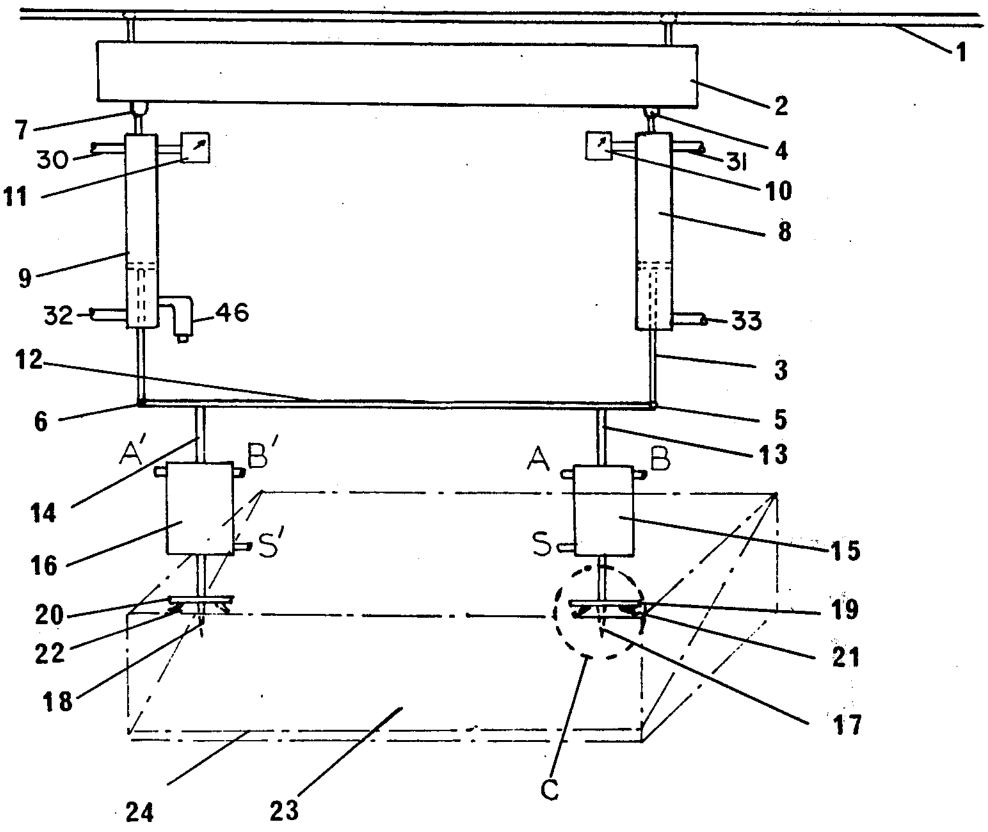
FIG. 1 is an elevation view of the device.
Figure 2:
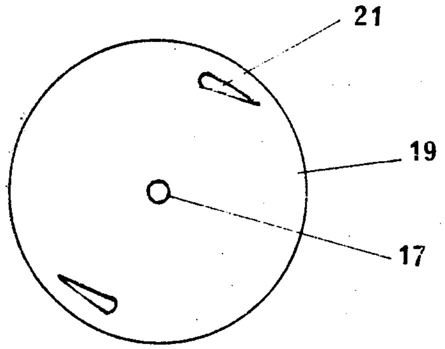
FIG. 2 is a plan view from below to above, of the detail shown in the circle C in FIG. 1.
Figure 3:
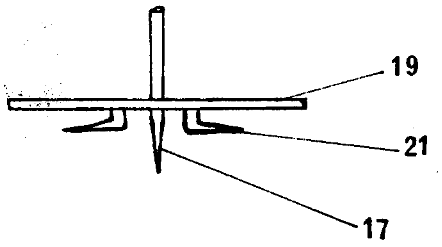
FIG. 3 is an elevation view of the detail shown in FIG. 2.

The support for the device comprises rail 1, upon which travels a carrier 2. A trapezoidal arrangement 3, articulated at points 4, 5, 6 and 7, is mounted on the carrier whose opposite vertical sides consists of two pneumatic pistons and cylinders 8 and 9 connected to a pressure sensitive or measuring device 10, 11.

On the lower crossbar 12 are disposed two arms 13 and 14 which are adjustable so that the distance between them is variable in order to accommodate various packing sizes. Each arm supports a pneumatic motor 15, 16, respectively. Each motor is fitted with two air inlets, A and B and A′ and B′, corresponding each to the two rotation directions of the motor, and an air outlet S and S′. These outlets are connected to a detector responsive to the troughput rate of the out-flowing air. Motors 15 and 16 are conduited through inlets A and B and A′ and B′ for opposing rotation in relation to one another. Thus air is conduited to inlet A of motor 15 and inlet B of motor 16 or to inlet B of motor 15 and inlet A′ of motor 16. The rotating shaft of the motors terminates with the points 17 and 18. Above points 17 and 18 is disposed a disc, 19 and 20, respectively, on the lower side of which are mounted a plurality of hooks or tines 21 and 22, offset equidistant from the center of the discs at which is located points 17 and 18.

The point of each hook or tine is disposed so as to penetrate the material upon rotation of the disc 19 and 20 in one direction.

The bale or sack 23 to be emptied is positioned under the device. The surrounding fabric is cut, as along line 24. The lowering means 8 and 9 are then energized to lower the gripping assembly until the discs 19 and 20 contact the fabric so that piercing points 17 and 18 penetrate the bale and the discs apply a small force on the bale in order to ensure that the contact is secure.

If the bale surface is not flat, the trapezoidal linkage 3, 4, 5 and 6 is distorted until it establishes a good contact. The latter is either monitored visually by measuring devices 10 and 11 indicating a stable value or sensed automatically by the loss of a differential pressure. Motors 15 and 16 are then started either manually or automatically. Compressed air is introduced into motors 15 and 16 through the inlets A and B′ to initiate rotation is opposed directions relative to each other. The hooks or tines 21 penetrate the fabric and the fabric is accordingly stretched between the two discs. When the resistant tension in the fabric equals the torque of the motor, a value which can be pre-set, the rotation of the motors terminates but the rotational position of discs 19 and 20 is maintained. This condition is easily detected by an air flow meter, or a pressure sensitive switch such as a fluidic switch, which is responsive to the throughput rate of outgoing air from the motors, a throughput rate of zero or near zero, indicating the fabric is gripped and held at the predetermined tension valve. The gripping assembly can thus be moved, with assurance that there is a simultaneous movement of the canvas. The jacks or pistons and cylinders 8 and 9 are thus energized by reducing the internal pressure to raise discs 19 and 20, thereby lifting the upper part of the cut-out fabric in order to tip the whole bale without risking damage to the device. Tipping of the bale allows it to be completely emptied with the fabric wrapper remaining engaged on the disc hooks.

When the fabric wrapper of the bale or sack is empty, carrier 2 is moved along rail 1 to a discharge position. Motors 15 and 16 are then energized but in reverse directions to their initial energization. This is done by supplying air to the other inlets A′ and B. The hooks or tines 21 thus relieve the tension on the fabric and disengage so that the fabric falls under its own weight. The unit is then returned to the initial station by the carrier for the next cycle.

Preferably all movements of the various components constituting the device, namely the carrier, jacks, and motors, can be energized from the same energy source, ideally a pneumatic source. The integration of the operation of these components predetermined sequential energization can thus be accomplished through conventional pressure sensitive or fluidic devices.

Figure 4:
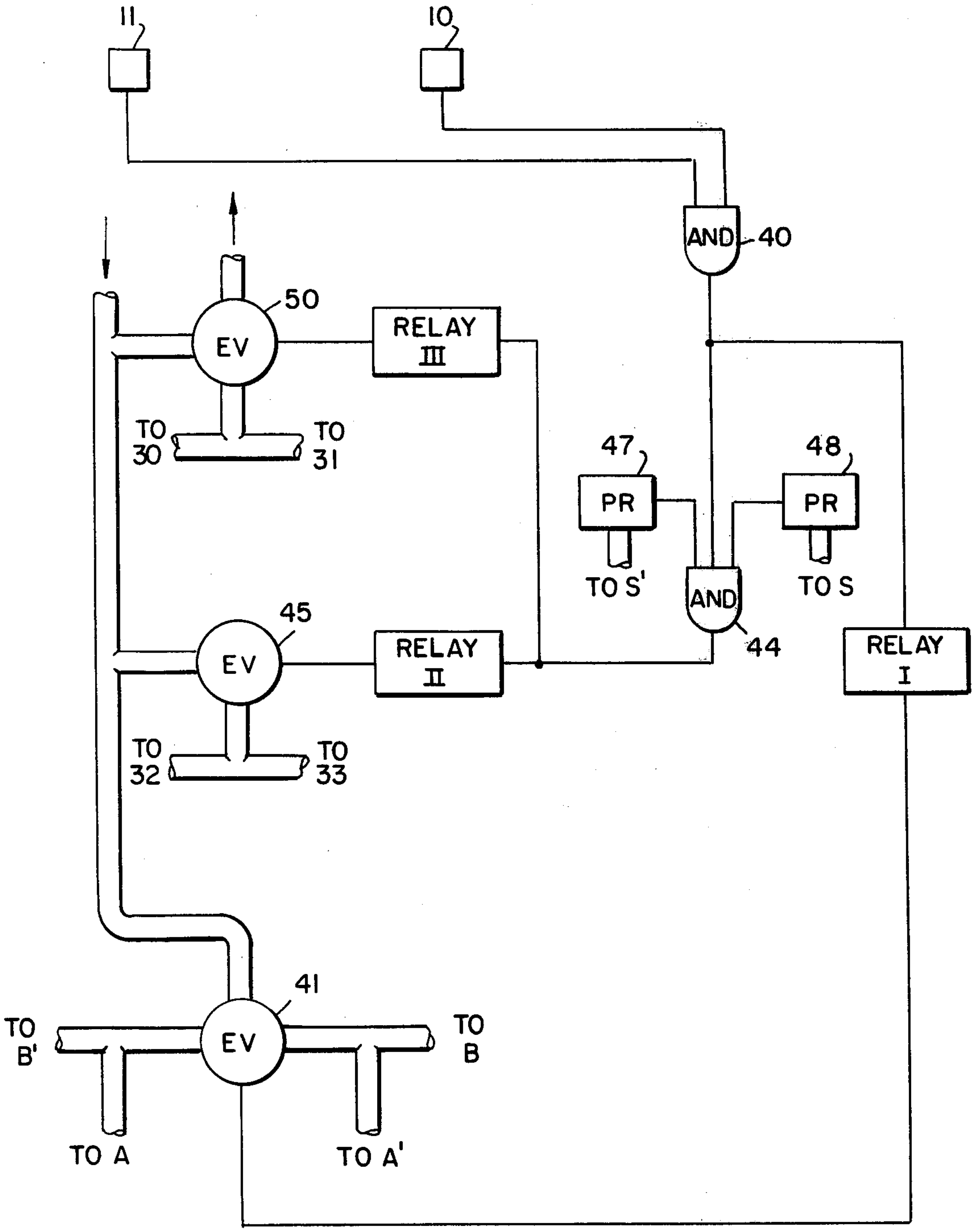
FIG. 4 is a typical control system for the components shown in FIG. 1.

A typical control system, shown in FIG. 4, for operation of the device utilizes a first electrovalve for controlling the pneumatic input through inlets 30 and 31 to cylinders 8 and 9. The pressure in each cylinder is measured by pressure sensors 10 and 11 which are connected to a first AND gate 40. When like pressures corresponding to the supply pressure are sensed in each of cylinders 8 and 9, a second electrovalve 41 is activated through relay I by the AND gate signal. The pneumatic output from this second electrovalve activates motors 15 and 16 in the manner described above. Flow meters or pressure relays 47 and 48 responsive to the output from the two motors are connected to a second AND gate 44. When the flow of outlet air from both motors is substantially zero, the resultant signal from the AND gate 44 reverses the first electrovalve 50 and also activates a third electrovalve 45 through relay II, thereby providing a pneumatic input to cylinders 8 through 32 and 33 for simultaneous reverse movement, thereby raising discs 19 and 20. A simple contact switch 46 limits the rise of the discs (and the engaged fabric) and activates movement along rail 1. Additional contact switches can be used for terminating movement along rail 1, reversing the rotation of motors 15 and 16, and returning the device to the original position. Other control systems integrating the actions of the various components will be apparent to those skilled in the engineering arts. Other variations in the described embodiments without departing from the spirit of the invention will also be apparent to those skilled in the art, the invention itself being defined by the appended claims.

What is claimed is:

1. A device for engaging the fabric material of a sack-like or bale-like object comprising (a) a support, (b) at least a pair of gripping assemblies mounted on said support for independent reciprocal movement along the vertical axis, each of said assemblies comprising (i) a vertically shafted, reversible, low torque motor, (ii) a gripping disc disposed on the shaft of said motor, and (iii) at least one tine disposed on said gripping disc offset from the axis of rotation of said shaft and operable to pierce and engage fabric material upon rotation of said motor and disc in a first rotational direction, (c) means operable to lower each of said gripping assemblies independently until each has made contact with the fabric to be engaged, (d) means operable to energize each of said motors for rotation in said first direction when all of said gripping assemblies have made contact with said fabric, said motors in each pair of gripping assemblies being energized for opposing rotation, (e) means responsive to the tension created within the fabric engaged between the gripping assemblies upon their opposing rotation and operable to terminate rotation at a predetermined tension valve, (f) means operable to raise said gripping assemblies when said predetermined tension is reached, and (g) means operable to energize and reverse each of said motors to relieve said tension and disengage said fabric.

2. A device according to claim 1 wherein each of said discs carries a plurality of said tines radially disposed on said disc equidistant from the axis of rotation and further carrying a piercing point lying in the axis of rotation of said shaft and disc.

3. A device according to claim 2 where each of said tines is of an L-shaped configuration with a first portion disposed perpendicular to the surface of said disc and a second pointed portion disposed substantially parallel to the surface of said disc.

4. A device according to claim 1 wherein said means operable to lower and raise said gripping assemblies are a pneumatic piston and cylinder.

5. A device according to claim 1 wherein said motor is a pneumatic motor, the torque of which generated at said tine corresponds to the maximum of said predetermined tension valve.

* * * * *